US007033557B2

(12) United States Patent
Grasso et al.

(10) Patent No.: US 7,033,557 B2
(45) Date of Patent: Apr. 25, 2006

(54) METHOD FOR REMOVAL OF CONTAMINANTS FROM A HYDROGEN PROCESSOR FEED STREAM, AS IN A FUEL CELL POWER PLANT

(75) Inventors: Albert P. Grasso, Vernon, CT (US); Bryan F. Dufner, West Hartford, CT (US); Jay C. Files, Windsor, CT (US); John L. Preston, Jr., Hebron, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 11/235,858

(22) Filed: Sep. 27, 2005

(65) Prior Publication Data

US 2006/0029538 A1 Feb. 9, 2006

Related U.S. Application Data

(62) Division of application No. 10/458,706, filed on Jun. 9, 2003, now Pat. No. 6,979,505.

(51) Int. Cl.
*B01D 53/00* (2006.01)
*H01M 8/04* (2006.01)
*H01M 8/06* (2006.01)

(52) U.S. Cl. ................. 423/243.01; 423/210; 423/650; 423/651

(58) Field of Classification Search ........... 423/243.01, 423/210, 650, 651; 429/17, 19, 20, 34
See application file for complete search history.

(56) References Cited

U.S. PATENT DOCUMENTS 5,213,912 A 5/1993 Kumz et al. .................. 429/34
5,308,456 A 5/1994 Kunz et al. .................. 429/16
6,048,383 A 4/2000 Breault et al. ................. 95/44
6,207,308 B1 3/2001 Grasso et al. ................. 429/26
6,221,280 B1 4/2001 Anumakonda et al. ..... 252/372
6,299,994 B1 10/2001 Towler et al. ................ 429/17
6,428,916 B1 8/2002 Grasso et al. ................. 429/13
6,605,378 B1 8/2003 Saito et al. .................. 429/26
6,610,265 B1 8/2003 Szydlowski et al. ..... 423/242.1
6,645,650 B1 11/2003 Meyer et al. ................. 429/13
6,787,256 B1 * 9/2004 Matsui et al. ................. 429/13
6,890,673 B1 * 5/2005 Higashiyama et al. ........ 429/20

(Continued)

*Primary Examiner*—Steven Bos
*Assistant Examiner*—Ardith E. Hertzog
(74) *Attorney, Agent, or Firm*—Stephen A. Schneeberger

(57) ABSTRACT

Method and apparatus are provided for removing contaminants from a hydrogen processor feed stream, as in a fuel cell power plant (110). Inlet oxidant (38), typically air, required by a catalytic hydrogen processor (34) in a fuel processor (14) for a fuel cell stack assembly (12) in the power plant (110), may contain contaminants such as $SO_2$ and the like. A cleansing arrangement, which includes an accumulator/degasifier (142, 46) acting as a scrubber, and possibly also a water transfer device (118), receives the inlet oxidant and provides the desired cleansing of contaminants. Water in the water transfer device and in the accumulator/degasifier serves to dissolve the water-soluble contaminants and cleanse them from the oxidant stream. The cleansed oxidant stream (138') is then delivered to the hydrogen processor and to the fuel cell assembly, with minimal inclusion of detrimental contaminants such as sulfur.

6 Claims, 3 Drawing Sheets

U.S. PATENT DOCUMENTS

2002/0114747 A1 8/2002 Marchand et al.
2002/0160240 A1 10/2002 Matsui et al.
2003/0008187 A1 1/2003 Higashiyama et al. ........ 429/19
2003/0031616 A1 2/2003 Szydlowski et al. ........ 423/416
2004/0023096 A1 2/2004 Pratt et al. .................... 429/34
2004/0035055 A1 2/2004 Zhu et al. .................. 48/127.9

* cited by examiner

METHOD FOR REMOVAL OF CONTAMINANTS FROM A HYDROGEN PROCESSOR FEED STREAM, AS IN A FUEL CELL POWER PLANT

This application is a divisional of U.S. patent application Ser. No. 10/458,706 filed Jun. 9, 2003 now U.S. Pat. No. 6,979,505.

TECHNICAL FIELD

This invention relates to hydrogen processors, and particularly to hydrogen processing and processors as used in fuel processing systems for fuel cell power plants for providing a hydrogen-rich stream to a fuel cell stack assembly. More particularly, the invention relates to an arrangement for removing contaminants, especially sulfur, from the process flow stream.

BACKGROUND ART

Catalytic systems exist for processing a fuel stream to derive hydrogen, typically for use as a fuel or reactant. One example of such a fuel processing system resides in the fuel processors associated with fuel cell power plants. Fuel cell power plants are becoming well known for a variety of applications requiring a relatively clean and reliable source of electrical power. The power plant typically includes one or more fuel cell stack assemblies (CSA) having anode and cathode regions separated by an electrolyte. The electrolyte may take various forms, with phosphoric acid and solid polymer proton exchange membrane (PEM) being two of the more common, and gives rise to the characterization and operation of the fuel cell.

The generation of electrical power results from an electrochemical reaction occurring between fuel (a reducing agent) supplied at the anode and an oxidant (oxidizing agent) supplied at the cathode. The oxidant is typically air and the reducing agent is hydrogen in a pure, or more typically near-pure, form. The hydrogen may be obtained from various sources, with various forms of hydrocarbon feedstock being the most common. The hydrocarbon feedstock is catalytically processed by a fuel processing system (FPS) also associated with the power plant. The FPS converts the hydrocarbon feedstock to a hydrogen-rich fuel stream via reformation and shift reactions, and may also include selective oxidation to reduce CO levels.

The PEM-type fuel cell is enjoying increased interest, in part because of certain stabilities afforded by the solid membrane electrolyte and in part because of its ability to operate at relatively lower temperatures and pressures and higher current densities. However, the PEM fuel cell also has certain challenging requirements, one of which is the proper management of the water coolant in the system. The coolant water exists as a byproduct of the electrochemical reaction and is used for thermal management in the fuel cell, as a source of water and/or steam for the fuel processing system, and also to maintain appropriate moisture levels at the anode electrode adjacent the PEM membrane.

FIG. 1 illustrates a fuel cell power plant 10 generally in accordance with the prior art. The power plant 10 comprises a fuel cell stack assembly (CSA) 12, a fuel processing system (FPS) 14, a water management/treatment system 16, and may also include a water transfer device (WTD) 18. The CSA 12 is a PEM-type fuel cell, having an anode region 20, a cathode region 22, an electrolyte region 24 between the anode region 20 and the cathode region 22, and a coolant region and flow path 26. The electrolyte is PEM.

A hydrogen-rich fuel stream 28 is supplied to the anode 20 of CSA 12. That fuel stream 28 is derived from a source of hydrocarbon feedstock 30, by means of the FPS 14. The hydrocarbon feedstock may typically be methane, natural gas, gasoline, LPG, naphtha, or the like, and the FPS 14 converts the feedstock, as by reformation, to various component quantities and compounds, including $H_2$, CO, $CO_2$, $NH_3$, etc. As there is normally some sulfur content in the hydrocarbon feedstock 30 which may be deleterious to the catalysts (typically a noble metal such as platinum) in various portions of the FPS 14 and particularly the catalyst of anode 20 of the CSA 12, provision is made for removing, or at least reducing the level of, that contaminant from the fuel stream. That removal is typically accomplished with a desulfurizer, or hydrodesulfurizer (HDS) 32, normally connected between the source of hydrocarbon feedstock 30 and an initial or secondary portion of the FPS 14. The desulfurized feedstock is delivered to the FPS 14 via conduit 33.

The FPS 14 may take a variety of forms, but typically includes at least a hydrogen generator and a shift reactor for segregating the hydrogen from the hydrocarbon feedstock and for shifting resulting CO to $CO_2$. The FPS may also provide subsequent selective oxidation (SOX) to further reduce CO concentrations. While the hydrogen generator may take various forms depending on feedstocks, system dynamics, and/or cost considerations, one common general configuration is that of a partial oxidizer (POX), a catalytic partial oxidizer (CPOX), or an autothermal reformer (ATR), in which the typically desulfurized hydrocarbon feedstock is directly burned or combusted with a supply of oxidant (air) and, except with a POX, water and/or steam in a reformation reaction, which reaction components jointly and severally represent feed streams to the hydrogen generator.

In the illustrated example of FIG. 1, the initial hydrogen generator in the FPS 14 is a CPOX 34, which receives desulfurized hydrocarbon feedstock 30 via HDS 32. An oxidant source apparatus, such as blower 36, supplies the CPOX 34 with an oxidant 38, such as inlet air passed through the WTD 18. The blower 36, or preferably a separate blower 37, also supplies inlet air as oxidant to the cathode 22 of the CSA 12. The WTD 18 serves to transfer water, otherwise exiting the system, into the incoming air and thereby enhances water balance and energy efficiency of the plant 10. The WTD 18 may be of the general type described in U.S. Pat. No. 6,048,383 to Breault, et al and assigned to the assignee of the present invention, and alternatively referred to as a mass transfer device or, where the transfer of thermal energy is the principal application, an energy recovery device (ERD). The WTD 18 typically includes a mass transfer medium 39, such as one or more plates, membranes, or the like, for permitting mass transfer between the exiting and entering flow streams, while also maintaining their distinct flow paths. The CPOX 34 is also provided with a supply of water and/or steam 40, which may be taken from the coolant flow path 26 and/or the water treatment portion. 16 of the system. The CPOX acts in a known manner to catalytically reform, or at least partly reform, the hydrocarbon feedstock 30 in the presence of oxidant 38 and water and/or steam 40. Reference may be made to U.S. Pat. No. 6,299,994 for a better understanding of the relevant reformation and shift reaction formulas, as well as a general functioning of the CPOX 34, with the recognition, however, that the steam and fuel feedstock therein are premixed and reacted in a pre-reforming zone and the resulting effluent is reacted with air in the presence of a catalyst in the POX to provide the reformed effluent stream of $H_2$, CO, $CO_2$ and $H_2O$.

Although only the CPOX 34 of the FPS 14 of FIG. 1 is depicted as an identified block in the FPS, it will be understood that the FPS additionally includes a shift reactor and typically also a selective oxidizer, collectively represented by block 41, with those components functioning in a well-known manner. As noted above, the CPOX 34 and the remaining components of the FPS 14, as well as the catalyst of the anode 20, include catalysts that may be sensitive to various contaminants such as CO and sulfur, and components such as the HDS 32, the shift reactor and the selective oxidizer serve to reduce those contaminants.

The water management/treatment system 16 is provided to maintain coolant water in appropriate amount (supply) and temperature, and also to prevent or minimize problems that might occur as a result of contaminants in the coolant water. The process of reforming hydrocarbon feedstock to produce a hydrogen-rich fuel stream has the normal consequence of introducing various gases, such as $NH_3$ and $CO_2$, into the fuel stream. Those gases tend to dissolve into the water created in the fuel cell and thus enter the coolant. Those dissolved gases in the coolant represent contaminants in that they may cause the conductivity of the water to increase and support destructive shunt current corrosion. Accordingly, the water management/treatment system 16 is provided with an accumulator/degasifier 42 for interaction between an oxidant, typically cathode exhaust air 44 exhausted from the cathode region 22, and coolant water 46 collected in accumulator 42 from the coolant region 26, to facilitate removal of dissolved gases from the coolant.

Coolant water 46 from accumulator/degasifier 42 is circulated to the inlet of coolant flow path 26 in the CSA 12, through the CSA 12 where it acquires gases from the fuel reformation process, and from the CSA 12 for return to the water management/treatment system 16. The coolant exiting from the coolant flow path 26 of the CSA 12 is typically directed through a separator 48 that removes entrained gas bubbles from coolant, then through a radiator 50 for thermal control of the coolant, and is then returned to the accumulator/degasifier 42. Removal of certain dissolved minerals from the coolant water 46 is provided by a demineralizer 52 (DMN) connected in a coolant circuit from the accumulator/degasifier 42 that by-passes the CSA 12 and separator 48 and leads to the radiator 50. A circulation pump 54 connected between the outlets of the separator 48 and the DMN 52 and the inlet to radiator 50 serves to provide the requisite circulation in those liquid circuits. The cathode exhaust air 44 is admitted to the accumulator/degasifier 42 and caused to pass in gas-absorbing contact with the coolant water 46 to cause the gases dissolved in the coolant water to diffuse into the cathode exhaust air 44. That "gas-laden" air, which also contains significant water and some thermal energy, then leaves the accumulator/degasifier 42 via conduit 56 and is conveyed out of the plant via passage through the WTD 18 where water and thermal energy are transferred to the inlet air 38. Further, the exhaust from anode 20 is represented by conduit 58 and may be conveyed directly out of the system, or more typically is utilized for unburned hydrogen content to fuel a burner system (not shown), but in either event may be optionally directed through the WTD 18 (represented by broken line in FIG. 1) with the cathode exhaust 56, in order to recover water and/or thermal energy content it may possess.

An additional understanding of a water management/treatment system may be derived from reference to U.S. Pat. No. 6,207,308 to Grasso, et al and assigned to the assignee of the present invention. That patent describes a water management/treatment system that is similar in many respects to that of FIG. 1, but with the additional provision that it first passes its inlet air, ultimately destined for the cathode, through the degasifying apparatus to cleanse dissolved gases from the water coolant flowing in that degasifying apparatus. Moreover, the inlet air and the water containing the dissolved gases are caused to flow in a counter-current manner in the degasifying apparatus to maximize the release of gas from the coolant water.

While the prior art has addressed concerns with contaminants such as dissolved gases in the coolant water and sulfur in the hydrocarbon feedstock, as discussed with respect to the description of the fuel cell power plant 10 of FIG. 1, an additional concern remains that the level of the sulfur in the fuel stream delivered to the CSA 12 may be excessive as the result of other sources of sulfur. Specifically, the sulfur level target output from the HDS 32 in the fuel stream is 25 ppb/by vol. This fuel then feeds the CPOX 34 (reformer). Assuming no additional sulfur from another source, the 25 ppb becomes about 5 ppb/by vol. coming out of the CPOX 34. The drop in concentration is due to the dilution effect of air and steam that are added in the CPOX process. It has now been recognized that air has about 5 ppb sulfur on average, which contributes to the sulfur coming out of the CPOX. This is particularly true in large urban areas such as the Northeastern United States, where the sulfur level may be 5–10, to as much as 30, ppb/by vol. As a result, the level can be more like 10 ppb or greater, with additional sulfur possibly also coming from the water that is used for the steam. Thus it can be seen that the sulfur in the air can easily double the sulfur load affecting the water gas shift reactor (WGS) catalyst, any possible SOX catalyst, and possibly the catalysts of the fuel cell itself.

Accordingly, it is an object of the invention to provide method and apparatus for improved removal of contaminants from catalytic fuel processors for making hydrogen, and particularly for use in a fuel cell power plant.

It is a further object of the invention to improve the removal of sulfur as a potential contaminant to one or more of the catalysts in the fuel processor and/or cell stack assembly of a fuel cell power plant.

It is yet a further object of the invention to provide a relatively efficient and cost-effective arrangement for the improved removal of contaminants, such as sulfur, in a fuel cell power plant.

It is an even further object of the invention to provide an improved arrangement for reducing the level of sulfur present in the fuel and/or oxidant flow streams of a fuel processor and/or cell stack assembly for a PEM fuel cell power plant.

It is a still further object of the invention to provide a water transfer device (WTD) with enhanced capabilities for the reduction of contaminants.

DISCLOSURE OF INVENTION

In accordance with the invention, there is provided an improved contaminant removal method and system for a catalytic fuel processor for making hydrogen. The contaminant removal system finds particular use in a fuel cell power plant having a fuel cell stack assembly (CSA) and a fuel processing system (FPS), though is not exclusive thereto. The FPS includes a hydrogen generator, such as a CPOX or the like, and a shift reactor for converting a hydrocarbon fuel stream to provide a hydrogen-rich stream for use in the CSA. The FPS further includes a supply of oxidant for connection to the hydrogen generator for combustion therein with the fuel stream to convert some of the hydrogen. In anticipation that the supply of oxidant contains a contaminant at least including sulfur, deleterious to one or both of the FPS and the CSA, the contaminant removal system of the invention comprises a cleansing arrangement connected intermediate the supply of oxidant and the hydrogen generator for reducing at least the sulfur contaminant in the supply of oxidant prior to admission of the oxidant to the hydrogen generator.

In a general arrangement according to the invention, the oxidant containing the sulfur contaminant, typically including $SO_2$, is caused to pass in intimate mass transfer association with water to permit dissolution of the sulfur/sulfur compound into the water. That intimate mass transfer association is achieved by maximizing the area and time of the oxidant/coolant interface. The oxidant thus freed of that sulfur is then passed to the hydrogen generator for combustion with the fuel stream.

In accordance with one preferred embodiment, the degasifying/accumulator apparatus typically associated with the water management/treatment system of present power plant systems is configured, or reconfigured, to act as a scrubber, and receive the contaminant/sulfur-containing oxidant and pass it in intimate contact with water circulating in the system to remove soluble solids and gases and entrained solids, particularly the soluble sulfur/sulfur compounds, from the oxidant. In addition to sulfur compounds, other contaminants such as NaCl (sea salt) may be scrubbed from the oxidant. The cleansed oxidant is then passed to the hydrogen generator, and also to the cathode of the CSA. The dissolved sulfur and other contaminants may be removed from the water by means of a demineralizer typically forming part of the water treatment system.

In accordance with another embodiment of the invention, a water transfer device (WTD) typically present in existing power plants for managing the water content of inlet oxidant through mass transfer interrelation with exhaust reactant gas streams, is configured to use water in that exhaust gas stream and/or from other sources to enhance dissolution of sulfur/sulfur compounds contained in the inlet oxidant.

In a still further embodiment, the sulfur-cleansing capabilities of both the degasifying apparatus and the enhanced WTD are combined to optimize the removal of sulfur from the oxidant supplied to the hydrogen generator and to the cathode of the CSA.

In yet a further embodiment of the invention, the cleansing of the oxidant by its basic intimate mass transfer association with coolant, typically water, is further enhanced/supplemented by one or a combination of the following techniques and arrangements: a) the addition of water to the oxidant at or near the entry to the WTD, as by spray, and/or the inclusion of a condensation zone in, or near, the WTD to facilitate formation of sulfate aerosols in the oxidant stream for subsequent removal in the degasifying/accumulating apparatus; b) the inclusion of scavenger aids, such as iron oxide and/or calcium oxide, present either on surfaces in the WTD or in the accumulating apparatus for forming salts (soluble or insoluble) of sulfite and sulfate to thereby limit back diffusion of $SO_2$ into the gas phase; c) the inclusion of aqueous-based catalyst agents, such as iron oxide and/or hydrogen peroxide, typically in the coolant loop, to increase the oxidation rate of $SO_2$ in the accumulating apparatus to form highly soluble sulfate ions (i.e., sulfuric acid); and d) the inclusion of gas-phase catalyst agents, such as ozone, typically in a portion of the system through which the inlet oxidant passes to increase the oxidation rate of $SO_2$ in the accumulating apparatus to form sulfite and then to form sulfate aerosols.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
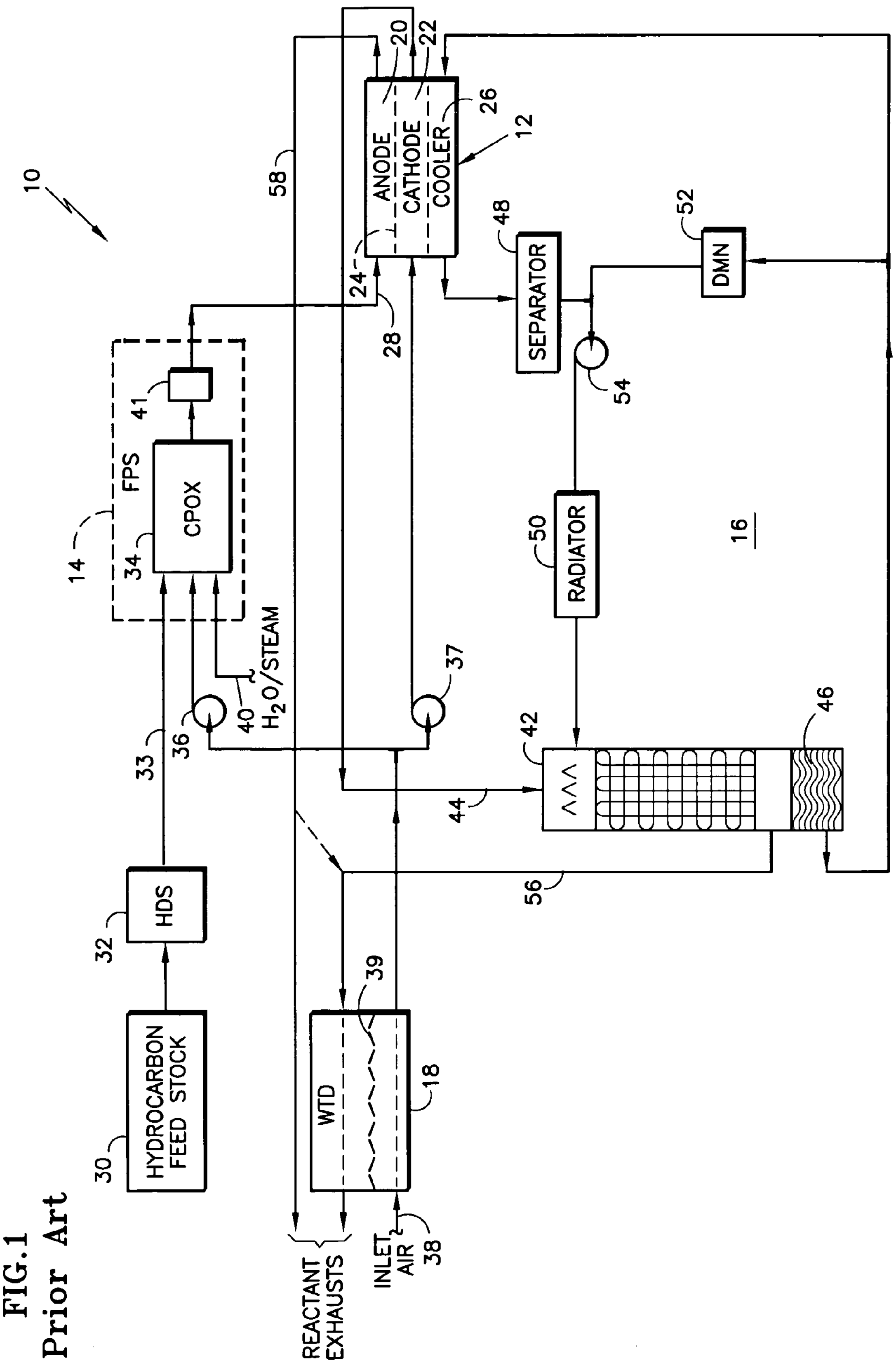
FIG. 1 is a simplified schematic illustration of a fuel cell power plant having a fuel processing system, a water treatment system and an oxidant delivery system in accordance with the prior art.
Figure 2:
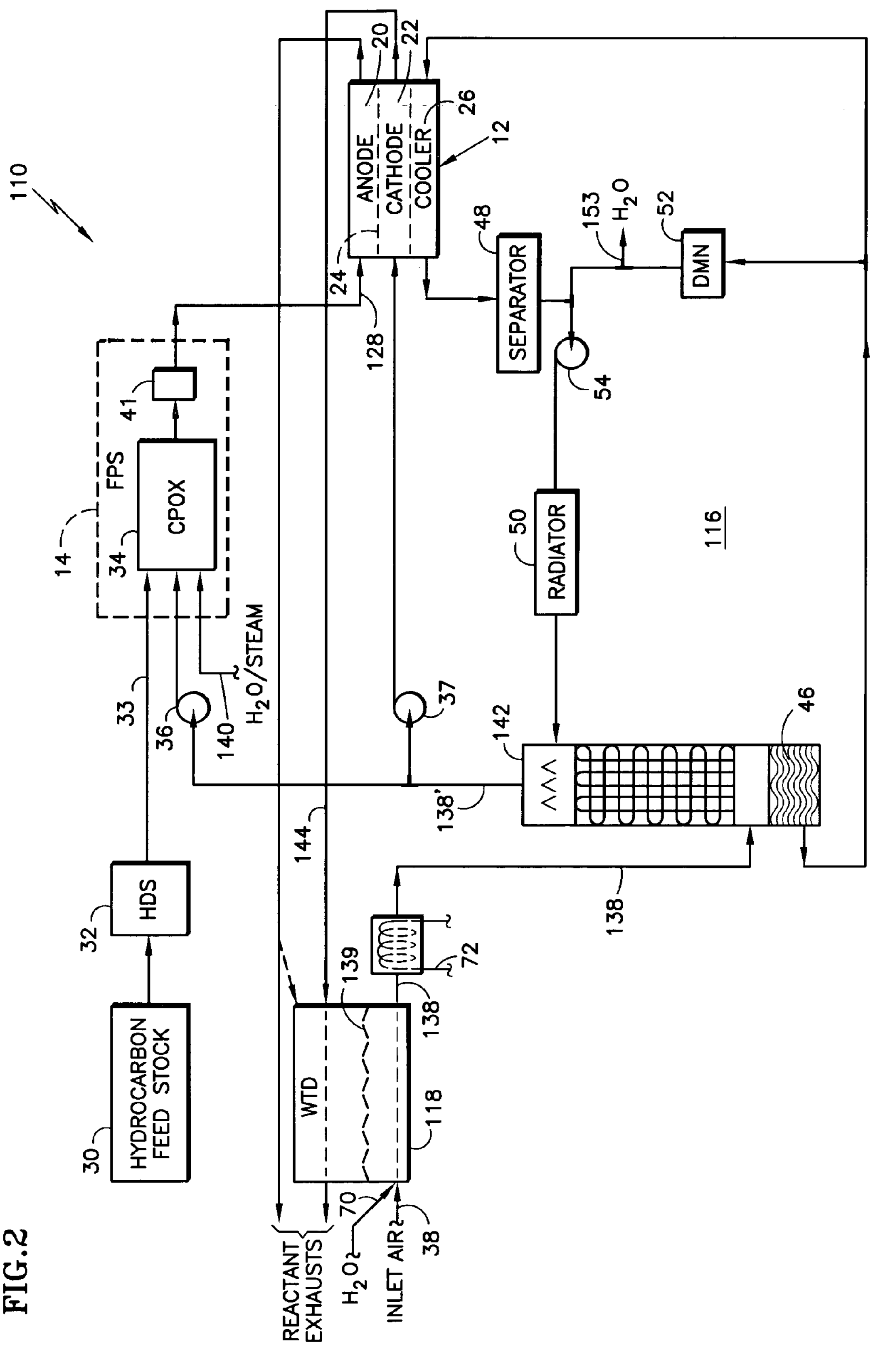
FIG. 2 is a simplified schematic illustration of a fuel cell power plant similar to that of FIG. 1, but illustrating the improved contaminant removal system of the invention, particularly with respect to cleansing sulfur from the oxidant to be supplied to the fuel processing system.

Reference is made to FIG. 2 for an understanding of the fuel processor (hydrogen generator) contaminant removal system of the present invention, particularly in the exemplary context of a fuel cell power plant and relative to the prior art of FIG. 1. Reference numbers identical to those of FIG. 1 are used in FIG. 2 for those components that are the same, or substantially the same, in the two configurations. However, where there is some functional, compositional, or structural difference occasioned by the invention, but the components of FIG. 2 nevertheless remain analogous to components in FIG. 1, they have been given the same reference number, but preceded by a “1”. The following description will emphasize the novel character, structure, and/or function of the contaminant removal system of the invention, and will attempt to minimize repetition of description that is duplicative of that provided with respect to FIG. 1. Moreover, while the description is focused on the removal of sulfur, including sulfur compounds, from the inlet air, it is intended to similarly include and apply to other water-soluble solids and gases, as well as entrained solids, that may be removed as contaminants by the method and apparatus of the invention.

The fuel cell power plant 110 includes a CSA 12 which receives, at anode 20, hydrogen-rich fuel 128 with reduced sulfur levels. The hydrogen-rich fuel is derived from a source of hydrocarbon feedstock 30, which is preliminarily desulfurized by HDS 32 and is then processed by FPS 14. The initial hydrogen generation stage of the FPS 14 comprises CPOX 34, which receives the fuel via conduit 33, and further receives desulfurized inlet oxidant 138' in accordance with the invention and water/steam 140 for a reformation reaction through direct combustion of the fuel and oxidant in the presence of a high-temperature platinum catalyst. The reformed, or at least partly reformed, fuel stream from the CPOX 34 is then further processed in a known manner in the FPS 14 to yield the hydrogen-rich fuel 128.

The desulfurized inlet oxidant 138' supplied to the CPOX 34 is obtained in the following manner. The inlet oxidant 38, typically inlet air, is subjected to one or more cleansing processes for removing (or at least significantly reducing the level of) sulfur from the air stream. Of main importance and impact is the removal of water-soluble $SO_2$ from the inlet oxidant stream 38, principally by means of an accumulating/degasifying apparatus 142 acting as a scrubbing apparatus. The accumulating/degasifying apparatus 142 is part of a water management/treatment system 116. The water management/treatment system 116 comprises a circuit that maintains coolant water in appropriate amount (supply), temperature, and quality in the fuel cell power plant 110. Alternatively, or typically additionally, $SO_2$ may be removed from the inlet oxidant 38 by means of an enhanced WTD 118.

The accumulating/degasifying apparatus 142 is functionally similar to the accumulator/degasifier 42 of the FIG. 1 embodiment, and perhaps even more similar to the degasifying apparatus described in the aforementioned U.S. Pat. No. 6,207,308. Notably, however, while those prior art arrangements had the objective of removing dissolved gases from the coolant exiting the coolant channel 26 of the CSA 12, the present arrangement additionally cleanses, or scrubs, soluble $SO_2$, and other soluble solids and gases and entrained solids, from the inlet oxidant 38 through intimate counter-current contact of the inlet oxidant stream with the coolant admitted to the degasifying apparatus 142 from the radiator 50. The inlet oxidant is supplied to the degasifying apparatus 142 via conduit 138 after passing through the WTD 118. The structure of the degasifying apparatus 142 and the points of entry thereto of the inlet oxidant in conduit 138 and the coolant from radiator 50, as well as the point of egress of the subsequently cleansed air, are such as to promote the intimate contact of the two fluids to dissolve the $SO_2$ from the air stream. Typically, the inlet oxidant and the coolant water in the water management/treatment system 116 are caused to pass each other in counter-current manner and over such interface surface area and duration as to maximize the intimate mass transfer association of the two fluids to cleanse the inlet oxidant. The degasifying apparatus may include appropriate baffles, flow direction changers, and or agglomerating screens to effect the cleansing action as well as subsequent demisting of the inlet air exiting therefrom. The cleansed inlet oxidant is then removed from the degasifying apparatus 142 typically, though not necessarily, near its upper end, via conduit(s) 138' connected through blowers 36 and 37 for delivery of the cleansed oxidant to the CPOX 34 and to the cathode 22 of CSA 12, respectively. The cleansed oxidant will contain little or substantially no $SO_2$, with a majority having been removed by the cleansing action. In this way, the initial contaminant content of the inlet oxidant does not adversely impact the objective of obtaining less than about 5 ppb/by vol. sulfur content in the fuel stream issuing from the CPOX 34.

In addition to the cleansing of sulfur from the inlet air provided by the degasifying apparatus 142, additional benefits in this and other regards are obtained with a WTD 118, optionally having enhanced capabilities relative to those of the WTD 18 described in FIG. 1. Referring further to FIG. 2 and additionally to FIG. 3, the WTD 118 typically includes, as mentioned above, a mass transfer medium 139, such as one or more plates, membranes, or the like, for permitting mass transfer of at least water between the exiting and entering flow streams, while also maintaining their distinct flow paths. Although the mass transfer medium 139 has been depicted, for simplicity, as a single broken-line surface, it in fact is comprised of a number of plates or the like, which present a large surface area to the flowing gas streams. Indeed, the mass transfer medium 139 may be a number of such plates arranged to define a number of generally-parallel adjacent flow channels of incoming oxidant and exhausting gases respectively to maximize the interface area of the medium between the counter-flowing gas streams. The cathode exhaust air is here designated 144 and is depicted as being connected from cathode 22 to the WTD 118 without passing through the degasifying apparatus 142. The CSA 12 produces humid reactant exhausts of the oxidant, as cathode exhaust air, and the reducing agent, as anode exhaust. Migration of water in the humid exhausting gas, through the plates to the relatively drier, contaminant-containing inlet oxidant, serves to dissolve some of the water-soluble sulfur contaminants (i.e., $SO_2$) to form sulfate aerosols. Those sulfate aerosols are removed from the inlet oxidant in the degasifying/accumulating apparatus 142.

In addition to the sulfur-cleansing of the inlet air by its basic intimate mass transfer association with water in the degasifying/accumulating apparatus 142 and further the WTD 18/118 as described above, additional enhancement of that cleansing capability may optionally be obtained, if required, via one or a combination of, the following described arrangements.

Figure 3:
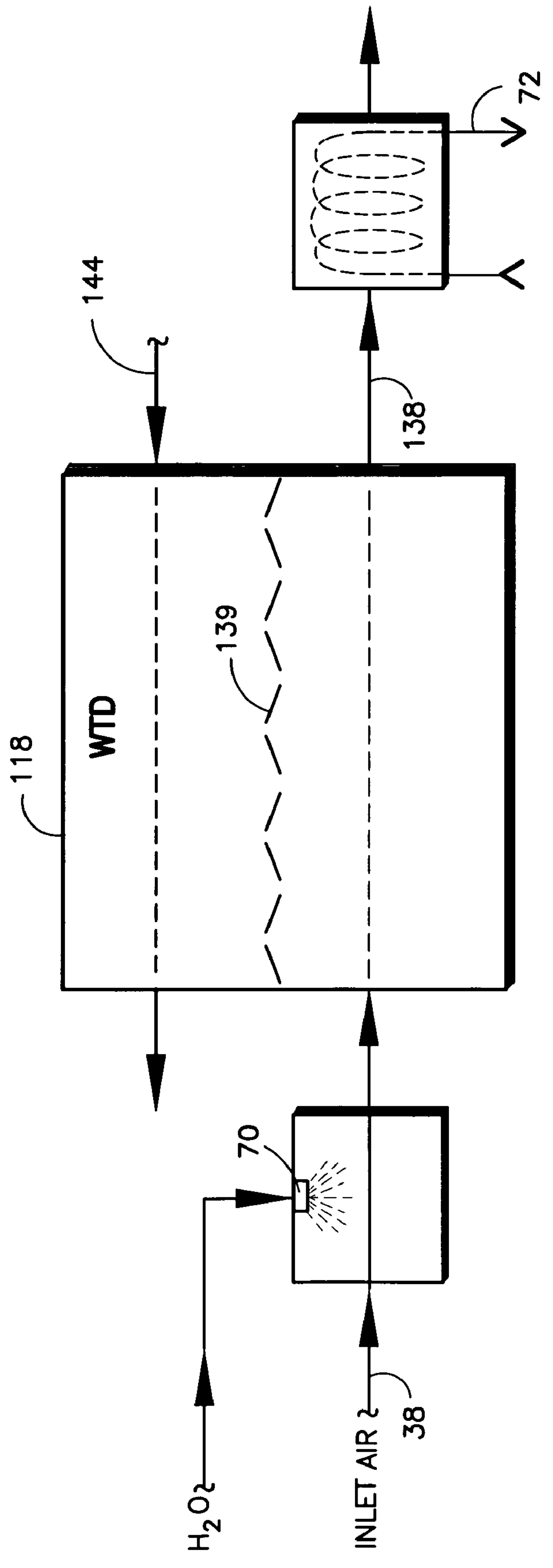
FIG. 3 is a simplified schematic illustration of a water transfer device enhanced in several optional manners for use in an embodiment of the improved contaminant removal system of the invention.

Referring to the WTD 118 of FIG. 2 and particularly FIG. 3, one or more water injection devices, depicted as spray nozzles 70, typically at or near the inlet end of the WTD 118 for the inlet oxidant 38, are disposed to inject a spray of water into the inlet oxidant stream 38 of the WTD 118, such that the excess water helps to dissolve $SO_2$ and form sulfate aerosols. Alternatively, or additionally, such a sulfate aerosol may be derived by condensing moisture contained in the inlet oxidant 38, or more particularly the inlet oxidant in the conduit 138 after exiting the WTD 118, as by the optional condensing coils 72 depicted in broken-line form in FIGS. 2 and 3.

Further optional arrangements for enhancing the cleansing of sulfur from the inlet oxidant include one or more of a) the inclusion of scavenger aids, such as iron oxide and/or calcium oxide, present either on surfaces in the WTD 118 or in the accumulating apparatus 142 for forming salts (soluble or insoluble) of sulfite and sulfate to thereby limit back diffusion of $SO_2$ into the gas phase; b) the inclusion of aqueous-based catalyst agents, such as iron oxide and/or hydrogen peroxide, typically in the coolant loop, to increase the oxidation rate of $SO_2$ in the accumulating apparatus to form highly soluble sulfate ions (i.e., sulfuric acid); and c) the inclusion of gas-phase catalyst agents, such as ozone, typically in a portion of the system through which the inlet oxidant 38, 138 passes, to increase the oxidation rate of $SO_2$ in the accumulating apparatus to form sulfite and then to form sulfate aerosols.

Because the demineralizer 52 serves to cleanse the dissolved sulfur, amongst other things, from the circulating coolant stream, that coolant stream at the outlet side 153 of the DMN 52 may be used as a source of cleansed water for use in the FPS 14, as, for example, for the water or steam 140 at the inlet to the CPOX 34.

Although the invention has been described and illustrated with respect to the exemplary embodiments thereof, it should be understood by those skilled in the art that the foregoing and various other changes, omissions and additions may be made without departing from the spirit and scope of the invention. For example, while the fuel processor to which the air cleansed of sulfur and other contaminants is supplied is associated with the production of hydrogen for a fuel cell power plant in the illustrated embodiment, it will be understood that the invention is also applicable to other similar catalytic fuel processors that provide hydrogen for other end-use applications. Moreover, although the accumulating/degasifying apparatus has been depicted in a structurally-integrated form in the preferred arrangement, it will be understood that multiple, closely-associated, separate components may be used to provide the similar function and results.

What is claimed is:

1. A method for removing water-soluble contaminants from a stream of inlet oxidant (38) to a hydrogen generator (34), comprising the steps of:

a. passing (138) the stream of inlet oxidant through a scrubber (142, 46) and contacting a stream of water flowing through the scrubber for dissolving the water-soluble contaminants and removing the dissolved contaminants from the stream of oxidant to cleanse the stream of oxidant; and b. subsequently passing (138') the cleansed stream of inlet oxidant to the hydrogen generator.

2. The method of claim 1 wherein the contaminants include sulfur, including sulfur compounds.

3. A method for removing water soluble contaminants from a stream of inlet oxidant (38) to a catalytic hydrogen generator (34) for a fuel cell assembly (CSA) (12) in a fuel cell power plant (110), the fuel cell power plant including a coolant loop (116) having coolant flowing through an accumulator/degasifier (142, 46), comprising the steps of:

a. passing (138) the stream of inlet oxidant through the accumulator/degasifier and contacting the coolant therein for dissolving the water-soluble contaminants and removing the dissolved contaminants from the stream of oxidant to cleanse the stream of oxidant; and b. subsequently passing (138') the cleansed stream of inlet oxidant to the catalytic hydrogen generator.

4. The method of claim 3 wherein the fuel cell power plant further includes a water recovery device (118), the CSA receives said cleansed stream of oxidant (138', 37) and discharges spent oxidant (144) containing moisture, and including the further step of:

passing the spent oxidant (144) and the stream of inlet oxidant (38) in counter-current relation through the water recovery device to transfer moisture from the spent oxidant to the stream of inlet oxidant to facilitate the dissolution of water-soluble contaminants therein prior to passing the inlet stream of oxidant to the accumulator/degasifier.

5. The method of claim 4, including the further step of directly injecting water (70) into the stream of inlet oxidant to provide moisture to enhance the dissolution therein of water-soluble contaminants from the inlet oxidant.

6. The method of claim 3 wherein the contaminants include sulfur, including sulfur compounds.

* * * * *